United States Patent
Lau et al.

(10) Patent No.: US 7,054,277 B1
(45) Date of Patent: May 30, 2006

(54) METHOD AND APPARATUS FOR PREVENTING LOOPS WITHIN A DATA STITCHING NETWORK ELEMENT

(75) Inventors: Carmel Chi Him Lau, Petaluma, CA (US); Michael F. Davis, Penngrove, CA (US); Thomas E. Black, Jr., Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 987 days.

(21) Appl. No.: 09/783,294

(22) Filed: Feb. 15, 2001

Related U.S. Application Data

(60) Provisional application No. 60/228,101, filed on Aug. 26, 2000.

(51) Int. Cl.
*H04L 12/28* (2006.01)

(52) U.S. Cl. ............... 370/256; 370/254; 370/255

(58) Field of Classification Search ............ None
See application file for complete search history.

(56) References Cited

U.S. PATENT DOCUMENTS 6,781,953 B1 * 8/2004 Naouri .................. 370/218
6,785,226 B1 * 8/2004 Oltman et al. ......... 370/228

* cited by examiner

*Primary Examiner*—Huy D. Vu
*Assistant Examiner*—Cynthia L. Davis
(74) *Attorney, Agent, or Firm*—Cindy Kaplan

(57) ABSTRACT

The present invention discloses a method and apparatus for preventing a layer-2 forwarding loop from being created within a network element (NE). Specifically, the present invention is used to prevent a loop from being formed within a NE by multiple data stitches for the same data circuit. The loops are prevented from being formed within the NE by running spanning tree on all but one of the multiple data stitches for a data circuit. The spanning tree blocks each of the data stitches on which it is run and thus only one data stitch remains and no loop is formed.

24 Claims, 13 Drawing Sheets

METHOD AND APPARATUS FOR PREVENTING LOOPS WITHIN A DATA STITCHING NETWORK ELEMENT

This application claims the priority under 35 U.S.C. 1.19(e) of provisional application No. 60/228,101 filed on Aug. 26, 2000.

BACKGROUND OF THE INVENTION

Telecommunications (telecom) systems are carrying increasing amounts of information, both in long distance networks as well as in metropolitan and local area networks (MAN/LAN). At present, data traffic is growing much faster than voice traffic, and includes high bandwidth video signals. In addition to the requirement for equipment to carry increasing amounts of telecom traffic there is a need to bring this information from the long distance networks to businesses and to locations where it can be distributed to residences over access networks.

The equipment, which has been developed to carry large amounts of telecom traffic, includes fiber optic transport equipment that can carry high-speed telecom traffic. The data rates on fiber optic systems can range from millions of bits per second (Mb/s) to billions of bits per second (Gb/s). In addition, multiple wavelengths of light can be carried on an optical fiber using Wavelength Division Multiplexing (WDM) techniques.

The use of optical fibers allows large amounts of telecom traffic to be transported over long distances. However, as one of ordinary skill in the art would recognize, it is impossible to have direct connections from each device sending data to each device receiving data. Moreover, some of the data being transmitted from a particular device may be intended for an intermediate point while other data is destined for a final point. Furthermore, the intermediate point may also wish to transmit data to the final point. The optical fibers provide a high-speed data stream (pipeline) upon which to transmit data traffic from a plurality of devices to a plurality of other devices.

Thus, telecom networks utilize network elements (NEs) that act as nodes in the transportation of data. The nodes may be nothing more than an intermediate point for data, may be a destination point for data, or may be a point where data is added to and removed from the data stream. NEs capable of providing this functionality, adding and removing traffic, are referred to as "add-drop" multiplexers (ADMs).

ADMs include multiple interface cards which receive high-speed data streams, create a time division multiplex (TDM) signal containing the multiple data streams, and route the time division multiplex signal to a cross-connect unit which can disassemble the data streams, remove or insert particular data streams, and send the signal to another interface card for transmission back into the networks. By aggregating the multiple data streams into a TDM data signal, the data rate of the TDM signal is by definition several times the rate of the maximum data rate supported by the interface cards.

Standardized interfaces and transmission hierarchies for telecom signals have been developed and include Pleisochronous Digital Hierarchy (PDH), Synchronous Digital Hierarchy (SDH), and Synchronous Optical Network (SONET). In addition to these telecom transport standards, standards have been developed for interconnecting businesses and computers within businesses. These Metropolitan and Local Area Network (MAN/LAN) standards include Ethernet, Gigabit Ethernet, Frame Relay, and Fiber Distributed Data Interface (FDDI). Other standards, such as Integrated Services Digital Network (ISDN) and Asynchronous Transfer Mode (ATM) have been developed for use at both levels.

A network circuit (NC) is the path that a data stream will follow in order to communicate with each device wishing to receive that data stream. The path includes the elements within a telecom network that are traversed by the data stream. That is, the NC consists of NEs and links between the NEs. Within each NE is a data circuit that defines which interface cards within the NE should receive the data. The links of network circuits are defined by VLANs so that one can differentiate multiple links between the same NEs. A spanning tree protocol is run on network circuits (often as identified by the VLAN) to prevent layer-2 forwarding loops from being created.

However, as more and more network circuits are created, the links of the network circuits will overlap. Thus, the likelihood of a network with an intersecting set of VLANs topology is likely. An intersecting set of VLANs topology is when different links within a network circuit are identified by partially intersecting virtual LANs (VLANs). This type of topology makes it difficult or impossible to run a standard spanning tree protocol in order to prevent layer-2 loops. Moreover, some NEs include internal links. The internal links may form a layer-2 loop if multiple links of a particular network circuit are connected to the NE.

For the forgoing reasons there is a need for a method and apparatus for preventing an intersecting set of VLANs network topology. There is also a need for blocking layer-2 forwarding loops for any network topology including loops internal to NEs.

SUMMARY OF THE INVENTION

The present invention discloses a method and apparatus for preventing a layer-2 forwarding loop from being created within a network element (NE). Specifically, the present invention is used to prevent a loop from being formed within a NE by multiple data stitches for the same VLAN. The loops are prevented from being formed within the NE by running spanning tree on all but one of the multiple data stitches for the VLAN. The spanning tree blocks each of the data stitches on which it is run and thus only one data stitch remains and no loop is formed.

According to one embodiment, a method for preventing a layer-2 forwarding loop within a data-stitching network element is disclosed. The method includes assigning a new network circuit to the data-stitching network element, determining that the new network circuit is assigned a VLAN that was previously assigned to an existing network circuit and running spanning tree on a data-stitch created by the new network circuit.

According to one embodiment, a computer program for preventing a layer-2 forwarding loop within a data-stitching network element is disclosed. The computer program includes assigning a new network circuit to the data-stitching network element, determining that the new network circuit is assigned a VLAN that was previously assigned to an existing network circuit, and running spanning tree on a data-stitch created by the new network circuit.

According to one embodiment, a method for ensuring that no layer-2 forwarding loops will be allowed within a telecommunications network is disclosed. The method includes defining a new network circuit for a network element, assigning a VLAN for the new network circuit, running spanning tree on links of the network element associated with the new network circuit and assigned the VLAN, and if the network element is a data-stitching network element, determining that the VLAN assigned to the new network circuit was previously assigned to an existing network circuit, and running spanning tree on a data-stitch created by the new network circuit.

According to one embodiment, a method for preventing a data-stitch within a data-stitching network element from inadvertently being blocked is disclosed. The method includes removing a network circuit from the data-stitching network element, determining that the removed network circuit was assigned a VLAN that is also used by another network circuit, and removing spanning tree from a data-stitch associated with the other network circuit.

According to another embodiment, a method for ensuring that no paths within a telecommunications network will inadvertently be blocked is disclosed. The method includes removing a new network circuit from a network element, disassociating links of the network element from a VLAN assignment associated with the removed network circuit. If the network element is a data-stitching network element, determining that the removed network circuit was assigned a VLAN that is also used by another network circuit, and removing spanning tree from a data-stitch associated with the other network circuit.

According to one embodiment, a network device for preventing formation of layer-2 forwarding loops within a telecommunications network is disclosed. The network device includes a memory, one or more network interfaces, and a processor. The processor is configured to define a new network circuit for the network device, assign a VLAN for the new network circuit, run spanning tree on links of the network device associated with the new network circuit and assigned the VLAN, determine that the VLAN assigned to the new network circuit was previously assigned to an existing network circuit, and run spanning tree on a data-stitch created by the new network circuit.

According to another embodiment, a network device for preventing paths within a telecommunications network from inadvertently being blocked is disclosed. The network device includes a memory, one or more network interfaces, and a processor. The processor is configured to remove a network circuit from the network device, disassociate links of the network device from a VLAN assignment associated with the removed network circuit, determine that the removed network circuit was assigned a VLAN that is also used by another network circuit, and remove spanning tree from a data-stitch associated with the other network circuit.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENTS

Figure 1A:
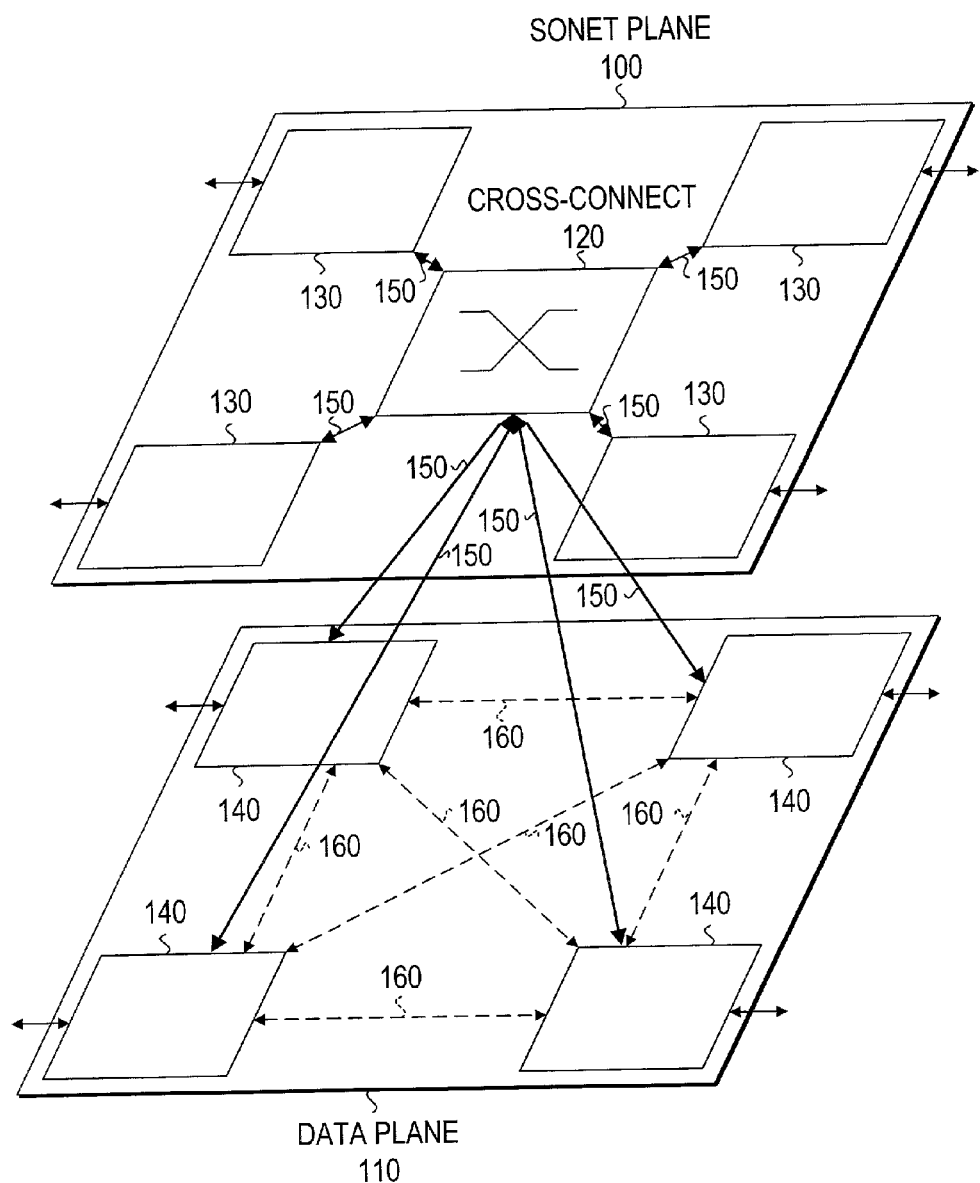
FIG. 1A illustrates a block diagram of the flexible cross-connect system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

With reference to the drawings, in general, and FIGS. 1 through 9 in particular, the apparatus and method of the present invention are disclosed.

Numerous telecommunications (telecom) and networking standards, including the following that are incorporated herein by reference, are used to transport data.

Bellcore Standard GR-253 CORE, Synchronous Optical Network (SONET) Transport Systems: Common Generic Criteria, Issue 2, December 1995;

Bellcore Standard GR-1400 CORE, SONET Uni-directional Line-Switched Ring Equipment Generic Criteria;

Bellcore Standard GR-1230 CORE, SONET Bi-directional Line-Switched Ring Equipment Generic Criteria, Issue 3A, December 1996;

Bellcore TR-NWT-000496, SONET Add-Drop Multiplex Equipment (SONET ADM) Generic Criteria, Issue 3, May 1992;

Bellcore Transport System Generic Requirements FR-440, Issue No. 98, September 1998;

Networking Standards, by William Stallings, published by Addison-Wesley Publishing Company (New York, 1993);

IEEE/ANSI Standard 802.3, Ethernet LAN specification;

IEEE Standard 802.1D bridge-to-bridge protocol; and

IEEE Standard 802.1Q, VLAN-aware bridges.

A telecommunications (telecom) network consists of numerous network elements (NEs) and links between the NEs. The links are cables, such as fiber optic cables, that transport the data between locations. The NEs consist of a plurality of interface cards, a control unit and a cross-connect. The interface cards are a combination of telecom cards, for communicating with the telecom network, and data cards for communicating with devices connected either directly to the NE or connected to the NE through a Metropolitan or Local Area Network (MAN/LAN). The control unit controls the operation of the NE and the cross connect routes data streams from one card to another so that the data streams are transmitted to the appropriate places within the telecom network. It can thus be said, that the NE is a flexible cross-connect system.

FIG. 1A illustrates a block diagram of a NE capable of routing traffic across two high-bandwidth planes. The NE includes a telecom plane 100, such as a SONET plane, and a data plane 110. The telecom plane 100 includes network interface subsystems 130, and the data plane 110 includes network interface subsystems 140. A centralized fully non-blocking cross-connect unit (XC) 120 is located in the telecom plane 100, which interfaces with the network interface subsystems 130 and the network interface subsystems 140.

Standardized telecom traffic, such as SONET, Synchronous Digital Hierarchy (SDH), Pleisochronous Digital Hierarchy (PDH), or other Time Division Multiplexed (TDM) or Wavelength Division Multiplexed (WDM) traffic, enters the system through the network interface subsystems 130, such as electrical or optical interface subsystems. The telecom traffic is transmitted from the network interface subsystems 130 over point-to-point connections 150 to the XC 120. The XC 120 processes the telecom traffic and then transmits the processed data back to a telecom network, such as a Wide Area Network (WAN), or transmits the processed data to a data network, such as a Metropolitan or Local Area Network (MAN/LAN). The processed data is transmitted to the telecom network via the network subsystem(s) 130, and to the data network via the network interface subsystems) 140.

Standardized data traffic, such as Ethernet, enters the system through the network interface subsystems 140, such as electrical or optical interface subsystems. The network interface subsystems 140 communicate with the XC 120 via point-to-point connections 150. The data plane 110 also allows for communications between network interface subsystems 140 via point-to-point connectors 160. Thus, the data traffic can be processed by multiple interface subsystems 140 before being transmitted to the XC 120 or back to the data network. As with the telecommunication traffic, the XC 120 processes the data traffic and transmits the processed data to a telecommunication network or a data network.

Figure 1B:
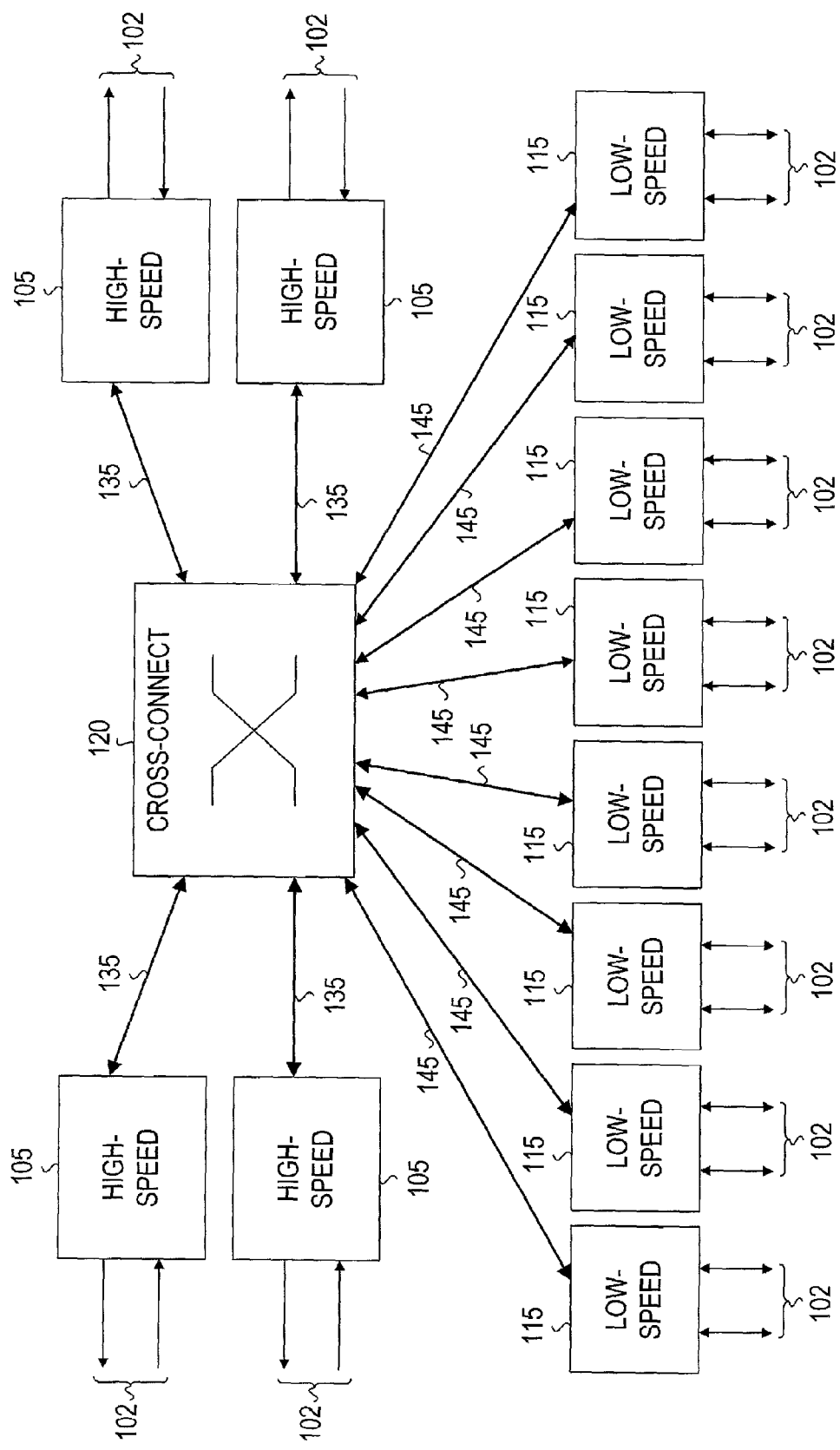
FIG. 1B illustrates a functional diagram of the flexible cross-connect system, according to one embodiment.

According to one embodiment, as illustrated in FIG. 1B, specific network interface subsystems are designated as high-speed interface subsystems 105 and others are designated as low-speed interface subsystems 115 having corresponding high-speed connections 135 and low-speed connections 145 to the XC 120. For example, the low-speed interconnections 145 may operate at the STS-48 rate of 2.488 Gb/s, while the high-speed interconnections 135 may operate at the STS-192 rate of 9.953 Gb/s.

The high speed network interface subsystems 105 may be realized as printed circuit boards containing active and passive electrical and optical components, and may contain multiple network interfaces 102 operating at the same or different speeds. The low speed network interface subsystems 115 may also be realized as printed circuit boards with active and passive electrical and optical components, and can contain multiple network interfaces 102 operating at the same or different speeds. As an example, a low speed network interface subsystem 115 can be realized as a DS-1 interface board supporting 14 DS-1 interfaces. Alternatively, a low speed network interface subsystem 115 can be realized as an Ethernet board supporting multiple Ethernet interfaces.

Figure 1C:
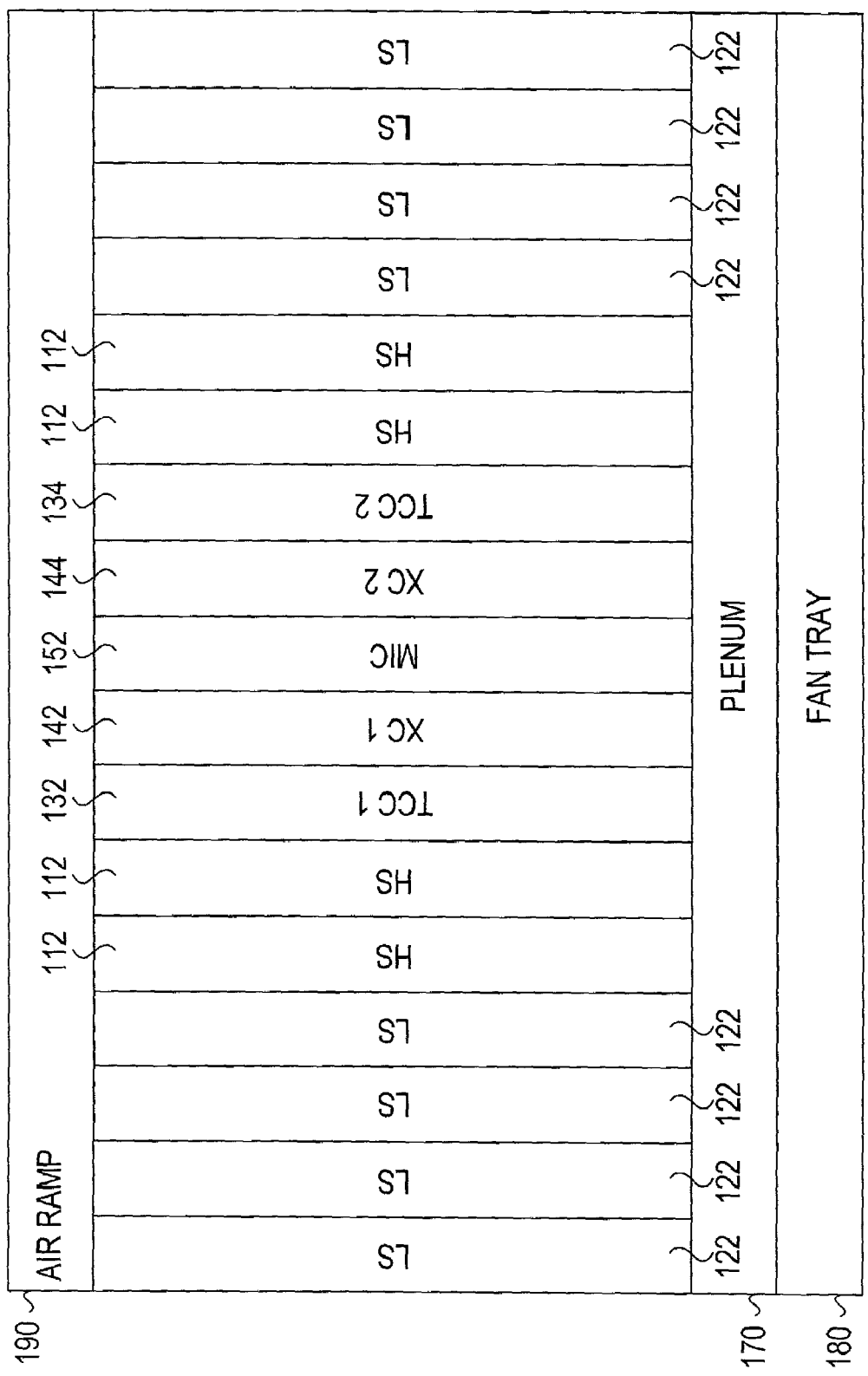
FIG. 1C illustrates the mechanical (rack) configuration of the flexible cross-connect system, according to one embodiment.

FIG. 1C illustrates the NE as a rack with card slots. The plug-in cards are grouped into two general groups. The first group is the common equipment cards, which include a XC card 142, a redundant XC card 144, a TCC card 132, a redundant TCC card 134, and a Miscellaneous Interface Card (MIC) 152. The second group is the network interface cards and includes low speed cards 122 and high speed cards 112, which form the telecommunication plane network interface subsystems 130 and the data plane network interface subsystems 140.

A master architecture of a NE, is defined in co-pending U.S. application Ser. No. 09/274,078 entitled "Flexible Cross-Connect with Data Plane" filed on Mar. 22, 1999. The basic software architecture of the NE is disclosed in co-pending U.S. application Ser. No. 09/533,421 entitled "Method and Apparatus for Controlling the Operation of a Flexible Cross-Connect System" filed on Mar. 22, 2000. The basic timing operations of the NE are disclosed in co-pending U.S. application Ser. No. 09/532,611 entitled "Method and Apparatus for Routing Telecommunication Signals" filed on Mar. 22, 2000. Application Ser. Nos. 09/274,078, 09/533,421, and 09/532,611 are herein incorporated by reference in their entirety but are not admitted to be prior art.

Network circuits (NCs) are defined as the elements of a telecom network that are required to transmit a data stream between a set of users. The NCs include NEs and the links between the NEs. As it is likely that multiple links will exist between NEs, the links are defined as virtual LANs (VLANs) to differentiate between the links. The links are often different speed or quality links. A spanning tree protocol is typically run for each unique VLAN or VLANSET to ensure that there is no layer-2 forwarding loops.

Figure 2:
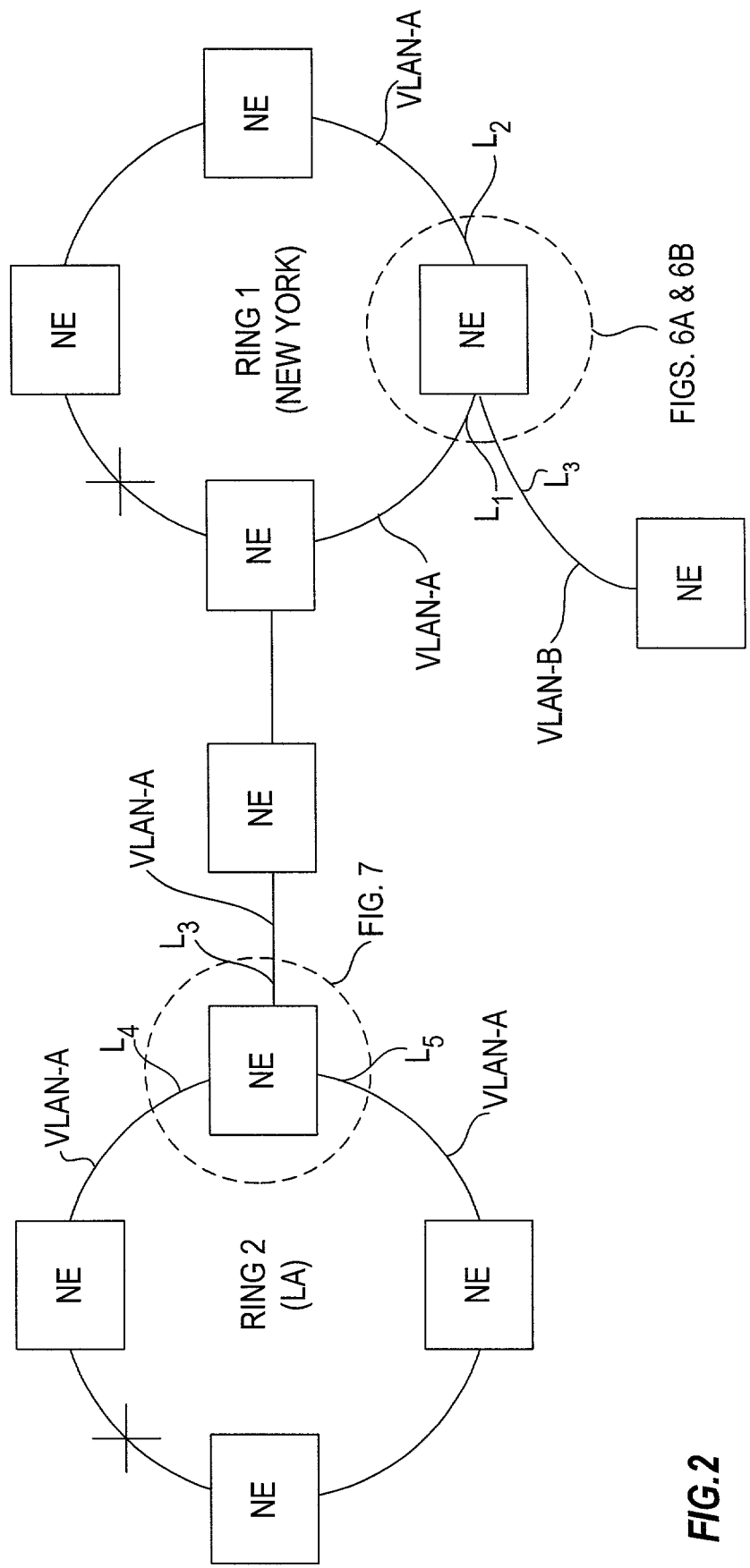
FIG. 2 illustrates a telecom network having a "bar-bell" topology.

For example, FIG. 2 illustrates a telecom network that would be common for distributing data between cities. As illustrated, the telecom network consists of a first ring for a first city, for example New York City, and a second ring for a second city, such as Los Angeles. Both the first and the second rings consist of a plurality of NEs and links therebetween. The two rings are connected via a plurality of NEs and links therebetween. While the bar bell telecom network may consist of a plurality of different NCs, it is assumed that each of them is assigned a single VLAN (VLAN-A). Thus, a standard spanning tree could be run on each link of the bar bell telecom network to block one of the links of each ring (illustrated as the links with an X), and thereby prevent the rings from forming a layer-2 forwarding loop.

Figure 3:
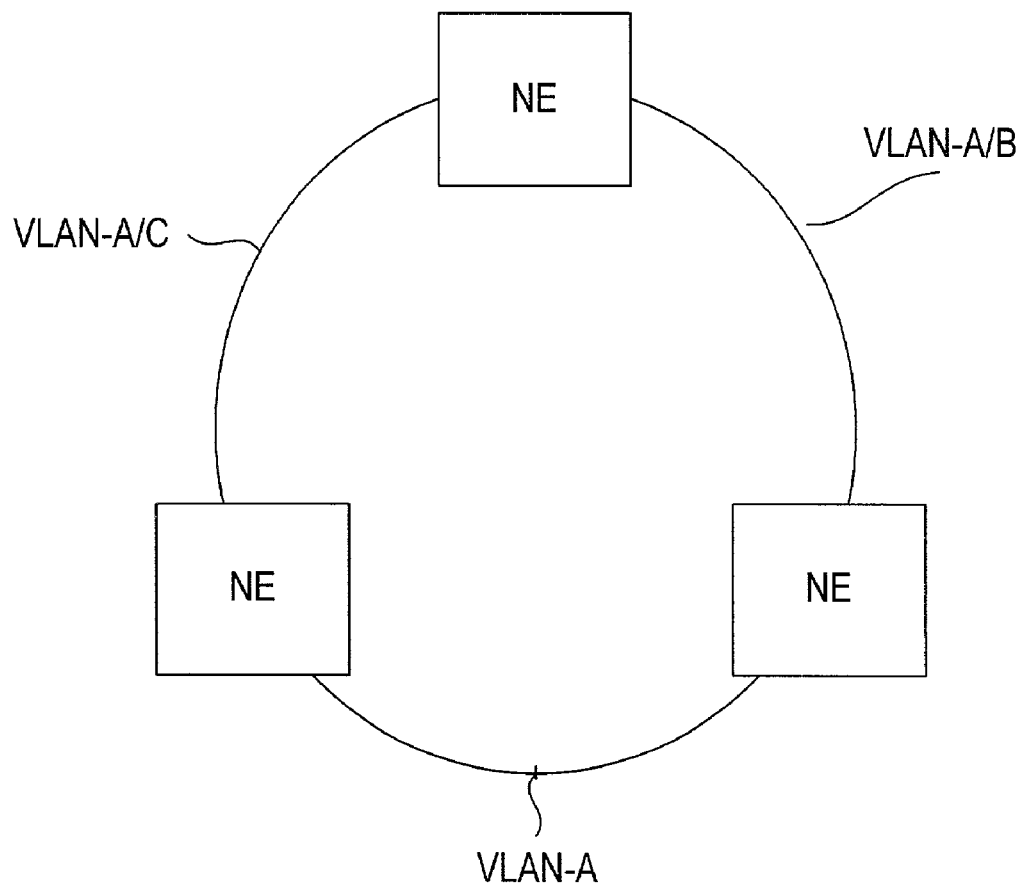
FIG. 3 illustrates a telecom network having a mix and match topology.

As one of ordinary skill in the art would recognize, if the rings were identified by a mix and match VLAN topology as illustrated in FIG. 3 it would be difficult to determine what spanning tree to run on each link in order to prevent layer-2 forwarding loops while at the same time not inadvertently blocking any links. As illustrated in FIG. 3, a ring is formed that has three different VLAN assignments (i.e., VLAN-A, VLAN-A/B, and VLAN-A/C). Running a single spanning tree on each link may inadvertently block the data associated with the VLAN-B or the VLAN-C portion of the VLAN-A/B or VLAN-A/C links respectively. However, running a separate spanning tree for each link would create a layer-2 forwarding loop for the VLAN-A data. One way to resolve this type of issue is to prevent mix and match topologies by restricting the assignment of VLANs.

Figure 4:
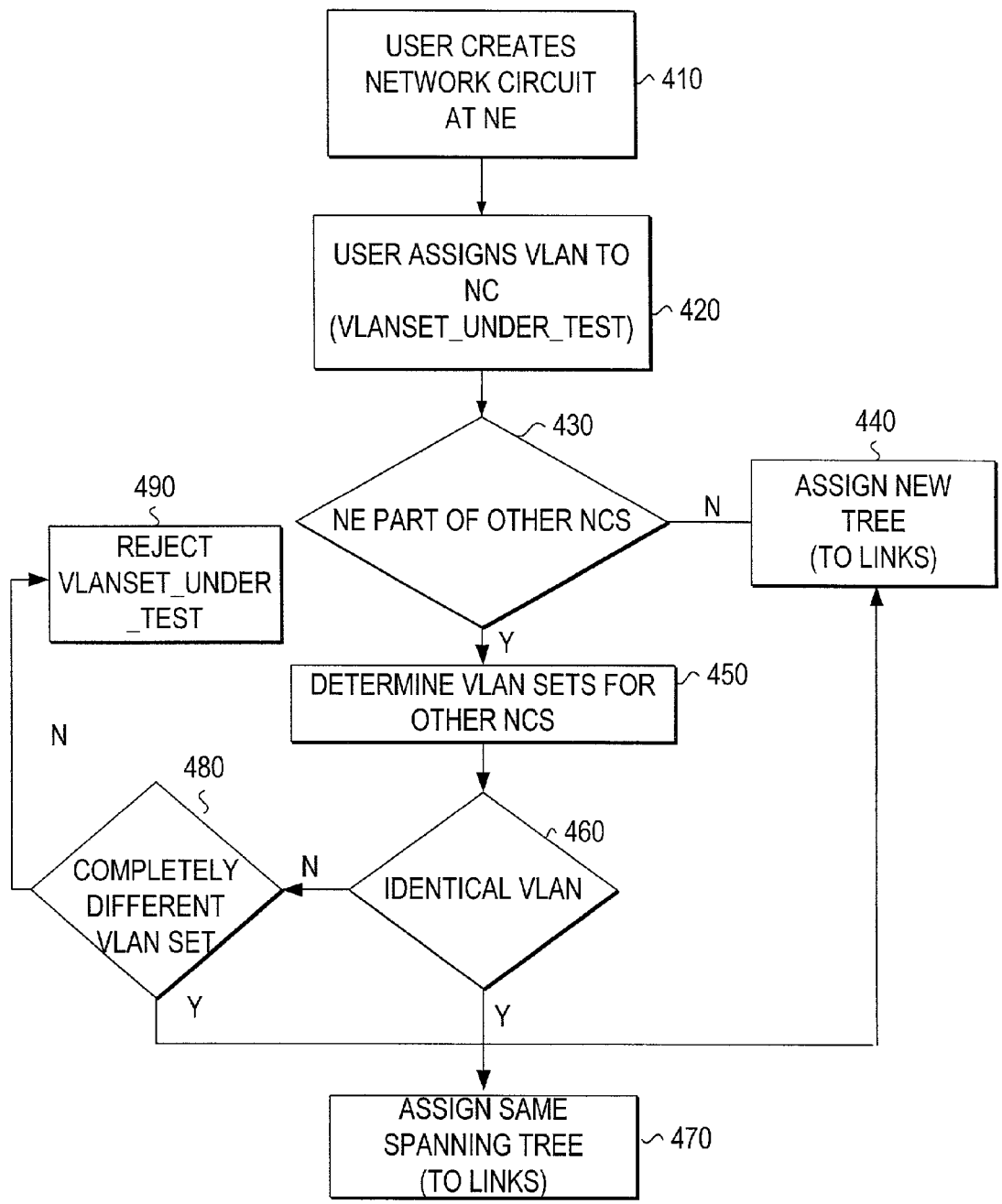
FIG. 4 illustrates an exemplary method for restricting VLAN assignments, according to one embodiment.

FIG. 4 illustrates a flowchart of one embodiment of the method for restricting the assignment of VLANs. As illustrated, a user creates a network circuit (NC) at a particular Network Element (NE) (step 410). The user then assigns a test VLAN (VLANSET_UNDER_TEST) to the NC (step 420). A determination is then made as to whether the NE is assigned to other NCs (step 430). If the NE is not part of any other NC, then the VLANSET_UNDER_TEST is valid and a new spanning tree should be assigned to the VLANSET_UNDER_TEST (step 440). In this case, the new spanning tree could be anything as there is no spanning tree assigned to this NE at this point.

If the NE is part of other NCs then VLANSETs for each of the other NCs is identified (Step 450). A determination is then made as to whether any of the other VLANSETs intersect entirely (i.e., are identical) with the VLANSET_UNDER_TEST (step 460). If one of the other VLANSETs intersects entirely with the VLANSET_UNDER_TEST, then the VLANSET_UNDER_TEST is valid and will run the same spanning tree as the VLANSET that is identical (step 470).

If none of the other VLANSETs intersect entirely with the VLANSET_UNDER_TEST, then a determination needs to be made if the VLANSET_UNDER_TEST is distinct from all of the other VLANSETs (step 480).

If all other VLANSETs are distinct from VLANSET_UNDER_TEST, then the VLANSET_UNDER_TEST is valid. A new spanning tree will then be assigned to the VLANSET_UNDER TEST (step 440). The new spanning tree could be anything that was not used before.

If the VLAN_UNDER_TEST is not distinct from all other VLANSETs, then the VLANSET_UNDER_TEST will be rejected (step 490) and the process will return to step 420.

It would be obvious to one of ordinary skill in the art that rearranging the steps of this method is well within the scope of the current invention. Moreover, there are numerous other methods that could accomplish the same result which are all within the scope of the current invention.

A method for restricting the assignment of VLANs is disclosed in co-pending U.S. application Ser. No. 09/750,180 entitled "Method and Apparatus for Restricting the Assignment of VLANS" filed on Dec. 29, 2000, which claimed priority of U.S. Provisional Application No. 60/228,102 filed on Aug. 26, 2000 entitled "Method and Apparatus for Restricting the Assignment of VLANS".

Figure 5A:
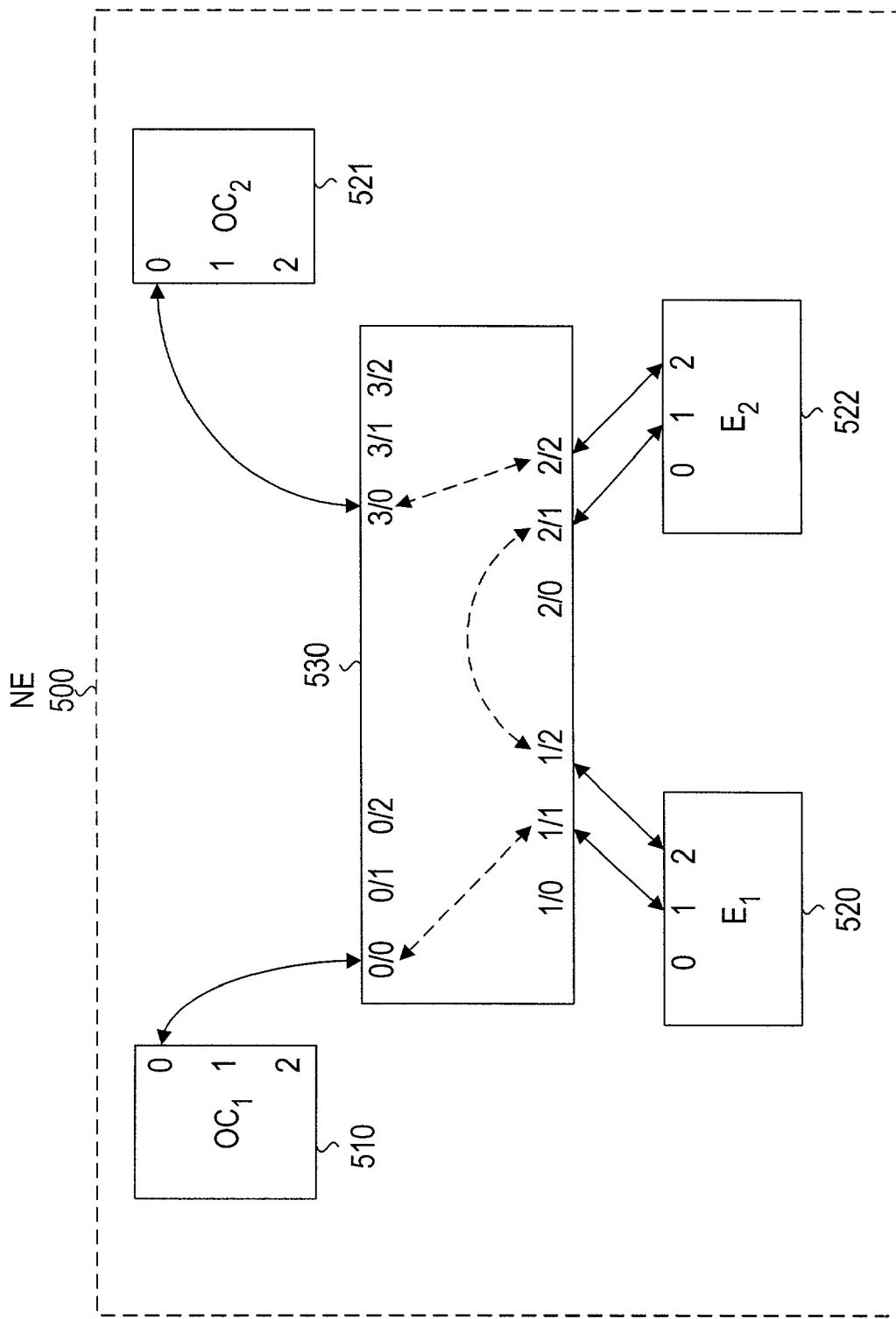
FIG. 5A illustrates the cross-connections between two optical cards and two data cards, according to one embodiment.

Referring back to FIG. 2, each of the NEs for each of the rings is likely transmitting data to multiple LANs or MANs. Thus, a data stream received by a NE is likely transmitted to multiple LANs or MANs prior to it being transmitted to the next NE. A data circuit is the path that a data stream will follow internal to an NE. The path includes all of the interface cards within the NE that will receive the data stream. Typically, the data circuit is formed as the data stream traverses the NE since each card within the NE only knows where the data stream is being transmitted to next and does not know the entire path. For example, as shown in FIG. 5A, a data stream may be received by OC1. All that the OC1 card knows is that the data stream is next being transmitted to E1, it does not know that E1 may next transmit the stream to E2, E2 to E3, etc. If one of the receiving interface cards becomes inoperable, the data circuit is rendered incomplete as the transmitting card will not be able to forward the data stream.

In order to prevent a data circuit from being rendered incomplete if one of the interface cards in the NE becomes inoperable, a data stitching circuit is created. A data stitching circuit is defined in a matrix within the NE. For each source point, the matrix lists a destination point, a next point, and a previous point. The stitching matrix in effect creates an internal link in the NE. Using the matrix, the data circuit can be stitched together in the event that one or more interface cards within the NE becomes inoperable.

Figure 5B:
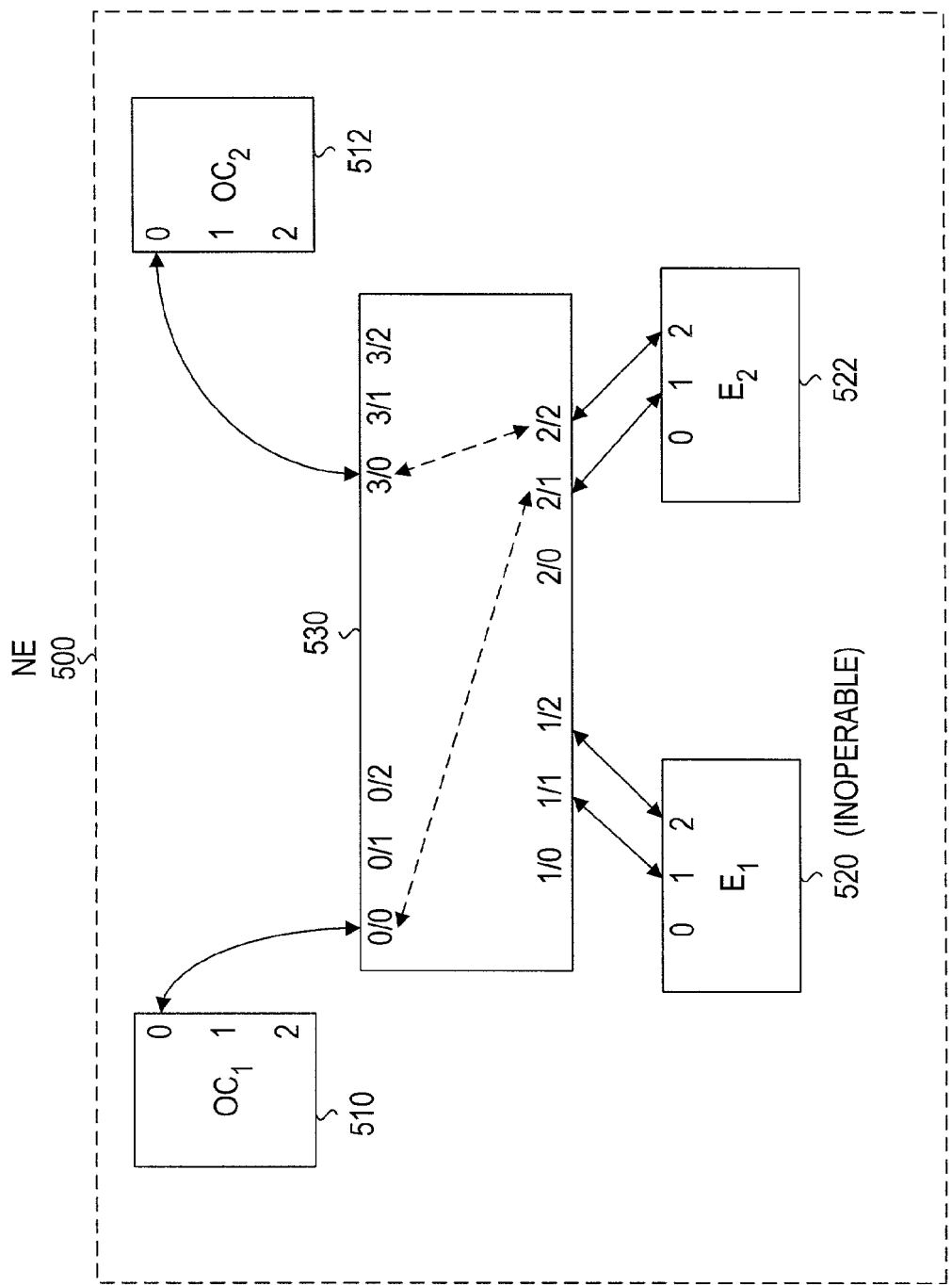
FIG. 5B illustrates the stitch healing when one data card goes out of service.

FIG. 5A illustrates an exemplary view of a data stitching NE 500. As illustrated, the NE 500 includes two telecom cards (OC1 510 and OC2 512), such as a SONET cards, and two data cards (E1 520 and E2 522), such as Ethernet cards, and a cross connect (XC) 530. As one of ordinary skill in the art would recognize, OC1 510 and OC2 512 can both transmit and receive data from a telecom network. A data stream received by the NE 500 at either the OC1 510 or the OC2 512 is sent to the XC 530. The XC 530 utilizes a data-stitching matrix to determine where to route the data stream. The XC 530 transmits the data stream from OC1 510 to the E1 520, and the data stream from OC2 512 to the E2 522. The XC 530 transmits the data stream from E1 520 to E2 522 and the data stream from E2 522 to E1 520. If one of the cards becomes inoperable the data-stitching matrix routes the data stream around the inoperable card. FIG. 5B illustrates the data-stitch routing the data stream around an inoperable E1 320.

The creation and use of data stitching circuit is disclosed in co-pending U.S. Applications Nos. 09/625,662 entitled "Method and Apparatus for Automatically Provisioning Data Circuits" and Ser. No. 09/625,663 entitled "Method and Apparatus for Rerouting Telecommunications Circuits", which were both filed on Jul. 26, 2000.

The telecom network views each data stitch as a path through the NE from one interface point to the other. Thus, the telecom network would view the data stitching NE of FIGS. 5A and 5B as having three paths through the NE from OC1 to OC2 (the data stitches from OC1 to E1, E1 to E2, and E2 to OC2). As such, spanning tree is not typically run internal to the NE, as it would inadvertently block the data stitching circuit.

FIGS. 5A and 5B simply illustrated an NE having a single data stitch defined. This was done for simplicity to illustrate the concepts of the data stitching NE. When a data stitching NE is used in a telecom network it is likely that the data stitching NE will have multiple data stitches defined.

For example, NE1 of FIG. 2 would have two data stitches defined. A first data stitch would be for VLAN-A that is defined as links L1 and L2. The second data stitch would be defined by link L3 that is assigned VLAN-B. A separate spanning tree would be run on the links of telecom network associated with each VLAN. As illustrated in FIG. 2, VLAN-A includes two separate loops (the NY and LA rings) but neither link L1 or L2 is blocked so that data streams could traverse NE1 in both directions. However, as one of ordinary skill in the art would recognize, while not illustrated in FIG. 2, it is possible that the spanning tree would block one of the links L1 or L2 so that the data streams were only traveling in one direction through the NE1.

Figure 6A:
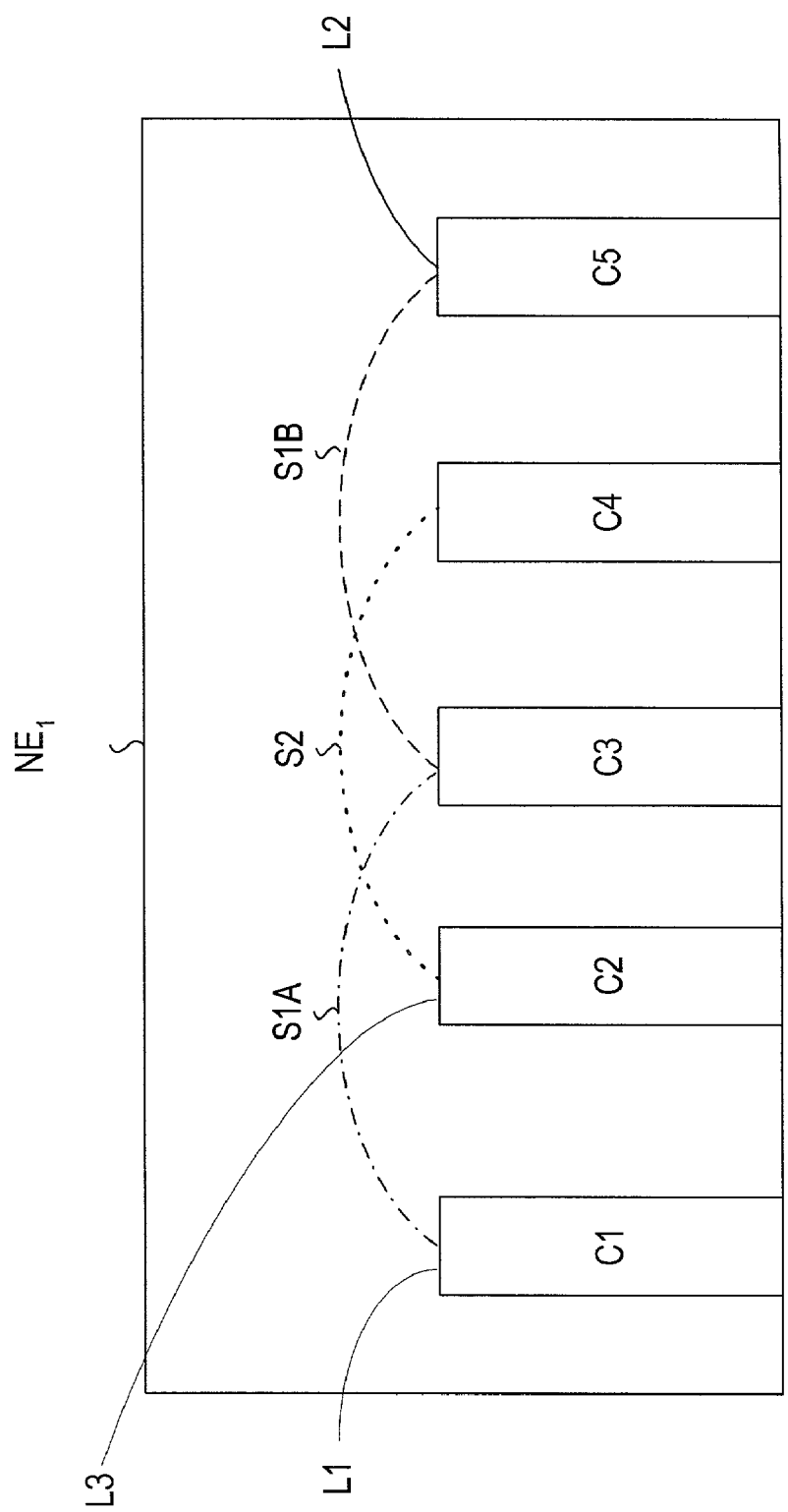
FIG. 6A illustrates multiple internal stitches and external links.

FIG. 6A illustrates an exemplary view of the multiple data stitches that are defined within NE1 of FIG. 2. As illustrated, the NE1 only displays interface cards (C1–C5) and does not display the XC. As one of ordinary skill in the art would recognize, the XC is actually routing the data stream between the interface cards as the XC receives the data stream from one interface card and routes the data stream to the next interface card.

FIG. 6A illustrates L1 connecting to a first interface card C1, L2 connecting to a fifth interface card C5, and L3 connecting to a second interface card C2. As illustrated in FIG. 2, L1 and L2 were defined as VLAN-A and L3 was defined as VLAN-B. As would be obvious to one of ordinary skill in the art, L1–L3 are the external links. These links are the links that could potentially be blocked by running spanning tree on all links associated with a particular VLAN assignment.

The data stitch associated with VLAN-A (L1 and L2) includes internal links from cards C1 to C3 (S1A) and C3 to C5 (S1B). The data stitch associated with VLAN-B (L3) includes an internal link from C2 to C4 (S2). As the two data stitches are separate, one would not run spanning tree on either of the stitches (i.e., VLAN-A or VLAN-B) within the NE, as that would cause the stitch to be inadvertently blocked. It should be noted that even if the data stitches for VLAN-A and VLAN-B were identical (i.e., C1 to C2, C2 to C3, C3 to C4), that spanning tree should not be run on either data stitch as the data stitches are uniquely assigned as different VLANs and should thus not be blocked.

Figure 6B:
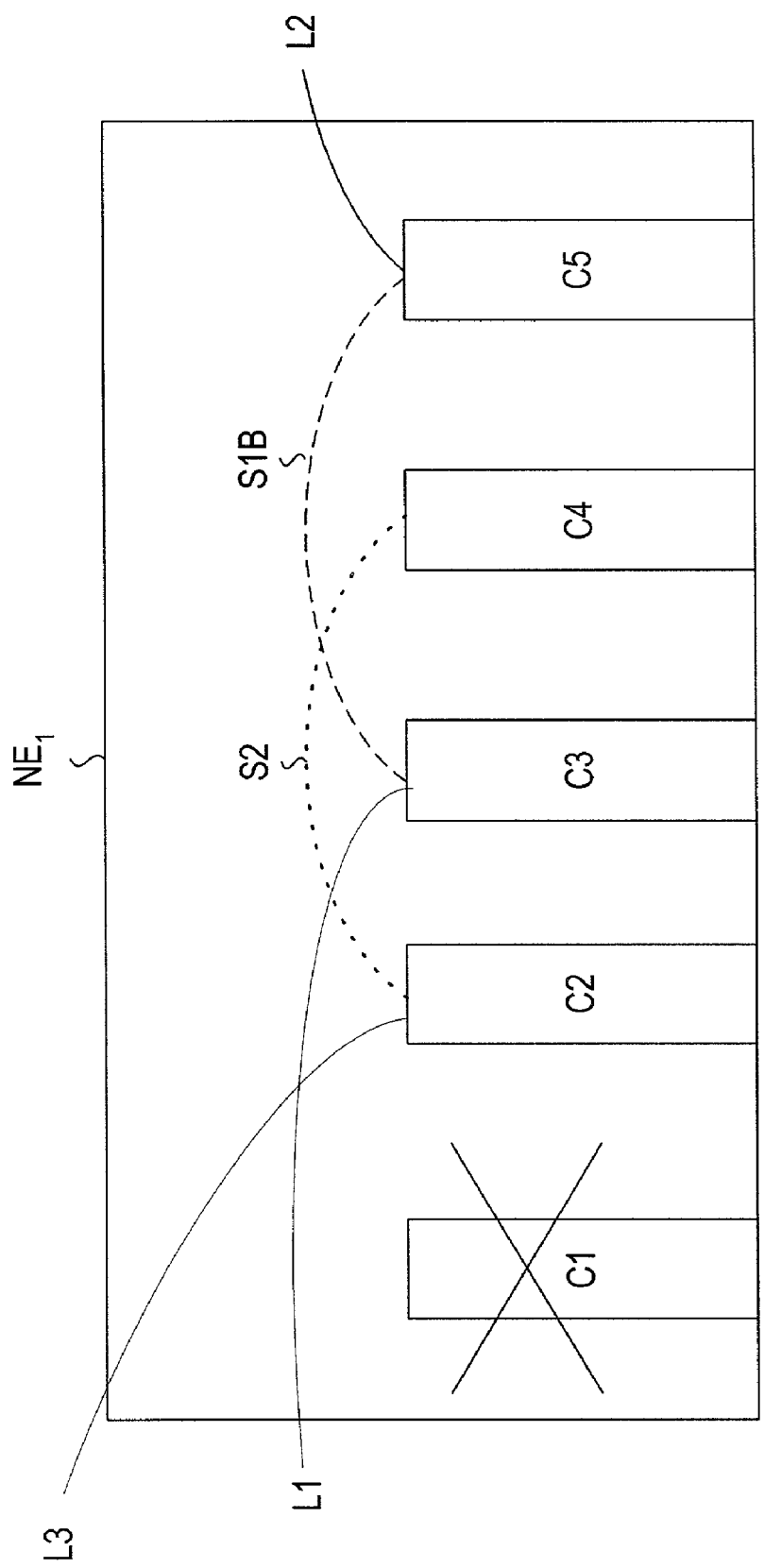
FIG. 6B illustrates how stitch healing can turn an internal stitch into an external link.

FIG. 6B illustrates what would happen if the first interface card C1 became inoperable. The NE would automatically stitch L1 from C1 to C3. This in effect turns an internal stitch S1A into an external link L1, which runs spanning tree. As one of ordinary skill in the art would recognize, if the third interface card C3 became inoperable, C1 would be stitched directly to C5.

Figure 7:
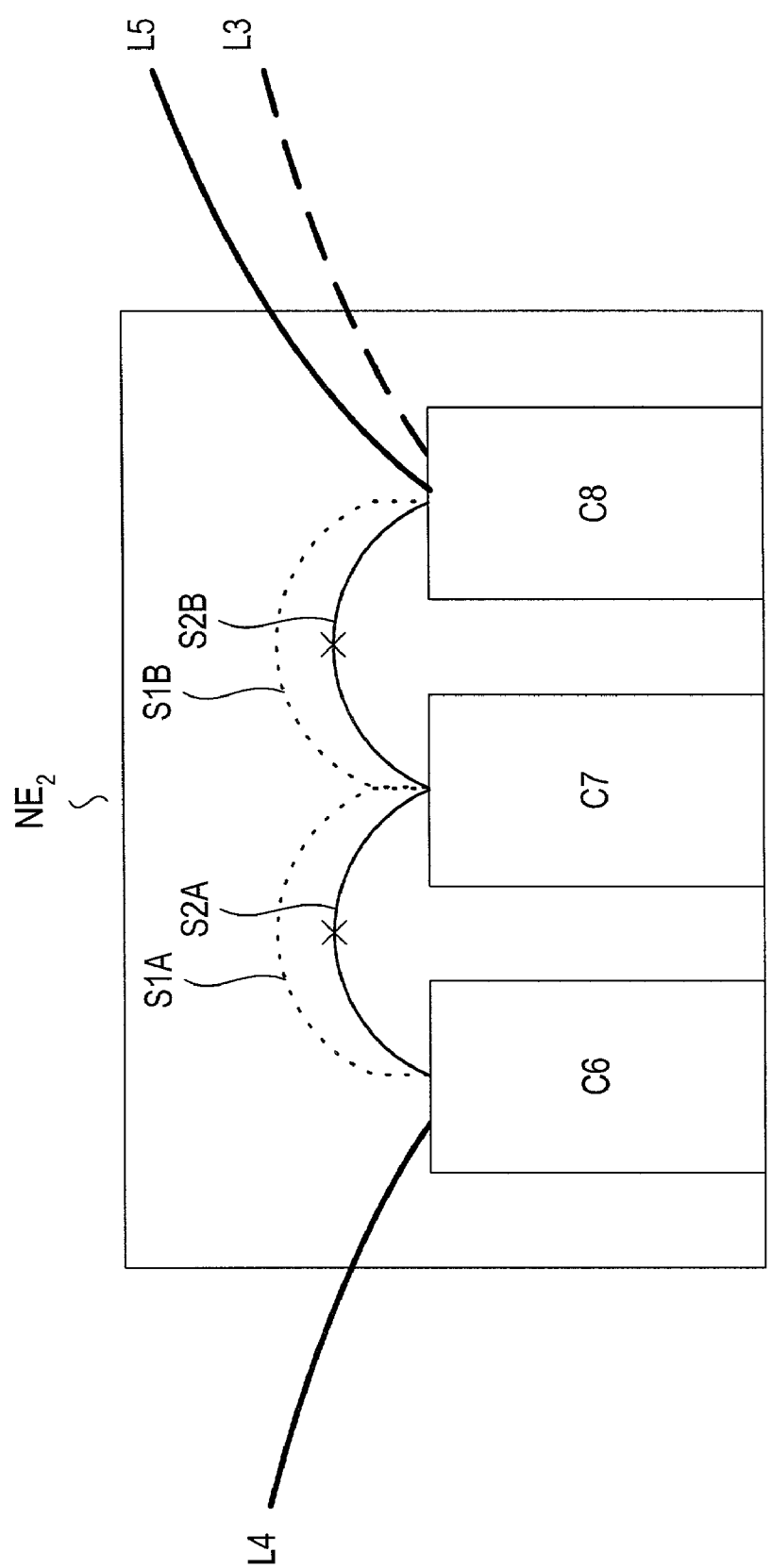
FIG. 7 illustrates the running spanning tree on all internal circuit stitches except for one circuit.

FIG. 7 illustrates an exemplary view of the multiple data stitches that are defined within NE2 of FIG. 2. As illustrated, NE2 includes interface cards C6–C8, L4 connecting to first interface card C6, and L3 and L5 connecting to third interface card C8. As illustrated in FIG. 2, L3–L5 are all defined as VLAN-A. The three links (L3–L5) will form two NCs for NE2. One NC will be a ring (i.e., having two links and thus connecting to two other NEs) and one will be a point-to-point (i.e., having only one link so that it only connects to one other NE). It is assumed that the ring NC is formed by L4, L5 and the point-to-point NC is formed by L3.

One of ordinary skill in the art would recognize that each NC would create a data stitch internal to the NE and thus there are two data stitches. Each of these data stitches would be identical as they are both identified by the same VLAN (i.e., VLAN-A). As illustrated, each of the data stitches goes from C6 to C7 and C7 to C8. The data circuit associated with L4 and L5 is identified as S1 with the stitches illustrated as S1A and S1B and the data circuit associated with L3 is identified as S2 with the stitches illustrated as S2A and S2B. Having multiple data stitching circuits defined for the same VLAN creates a layer-2 forwarding loop internal to the NE, thus affecting the performance of the telecom network. Thus, one of the two links needs to be blocked.

As previously mentioned running spanning tree internal to the NE blocks the data stitches within the NE. In the case of same VLAN multi-stitch NEs, spanning tree can be run on all but one of the data stitches to block the stitches and only leave one stitch remaining. As illustrated in FIG. 7, spanning tree is run on S2 (S2A and S2B) so that S2 is blocked and the only data stitch within the NE is S1 (S1A and S1B). To ensure that only one data stitch exists between the NE, the first data stitch created for a particular VLAN should not having spanning tree run on it, but each data stitch created thereafter should have spanning tree run thereon.

As should be obvious to one of ordinary skill in the art, if either C6 or C8 becomes inoperable, the NE will heal the circuit and the appropriate internal stitch will in effect become an external link. Moreover, if C7 became inoperable, C6 would be stitched directly to C8.

Figure 8:
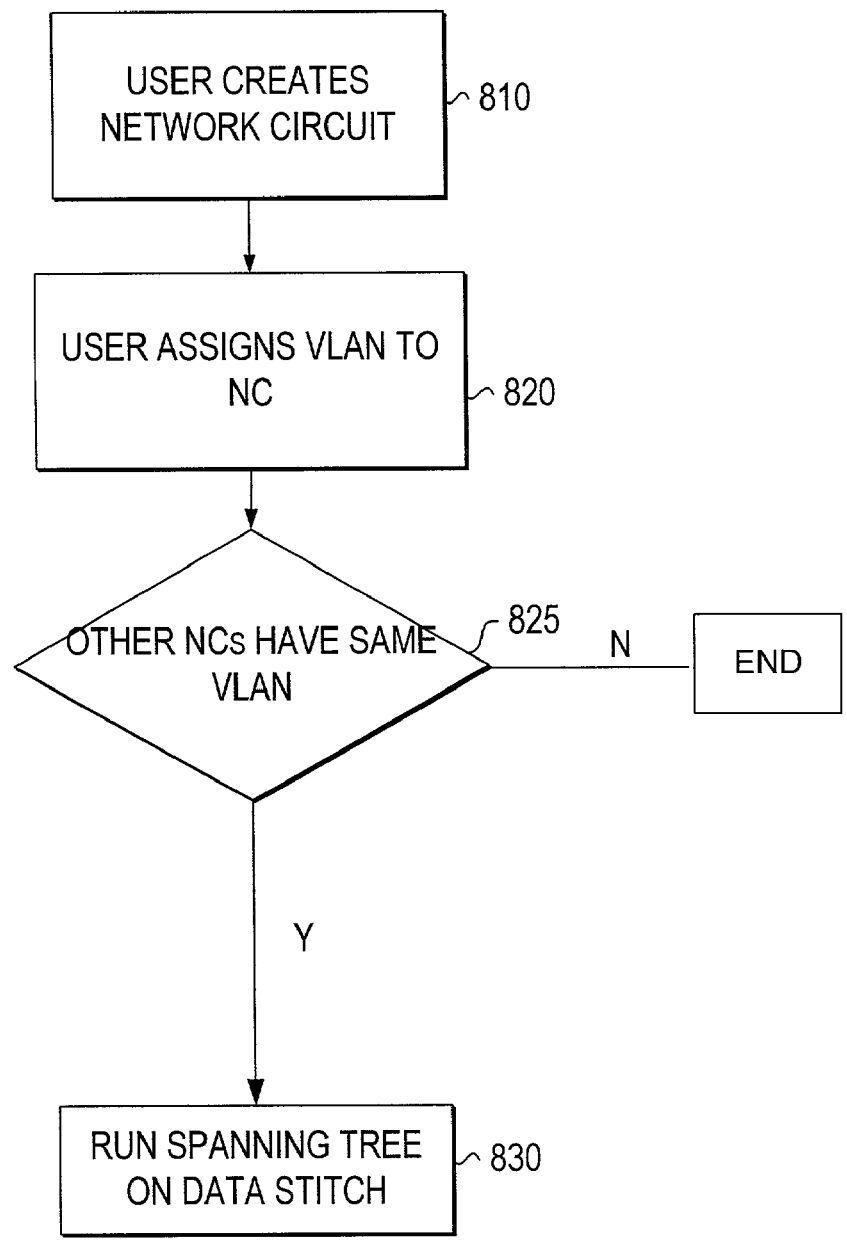
FIG. 8 illustrates a flow chart for assigning spanning tree to internal links, according to one embodiment.

FIG. 8 illustrates a flowchart of one embodiment of the current invention. As illustrated, a user creates a network circuit (NC) at a particular Network Element (NE) (step 810). The user then assigns VLAN(s) to the NC (step 820). A determination is made if the VLAN has already been assigned to a NC associated with that NE (step 825). If the determination is yes then the data stitch that is created within the NE will have spanning tree run on it to prevent a layer-2 forwarding loop from being created within the NE (step 830). This process would work for each successive NC (2 to n) for that NE that was assigned that particular VLAN. It should be noted that the method disclosed with respect to FIG. 8 could be a completely separate process or could be appended to the method described with respect to FIG. 4 or a similar method.

Figure 9:
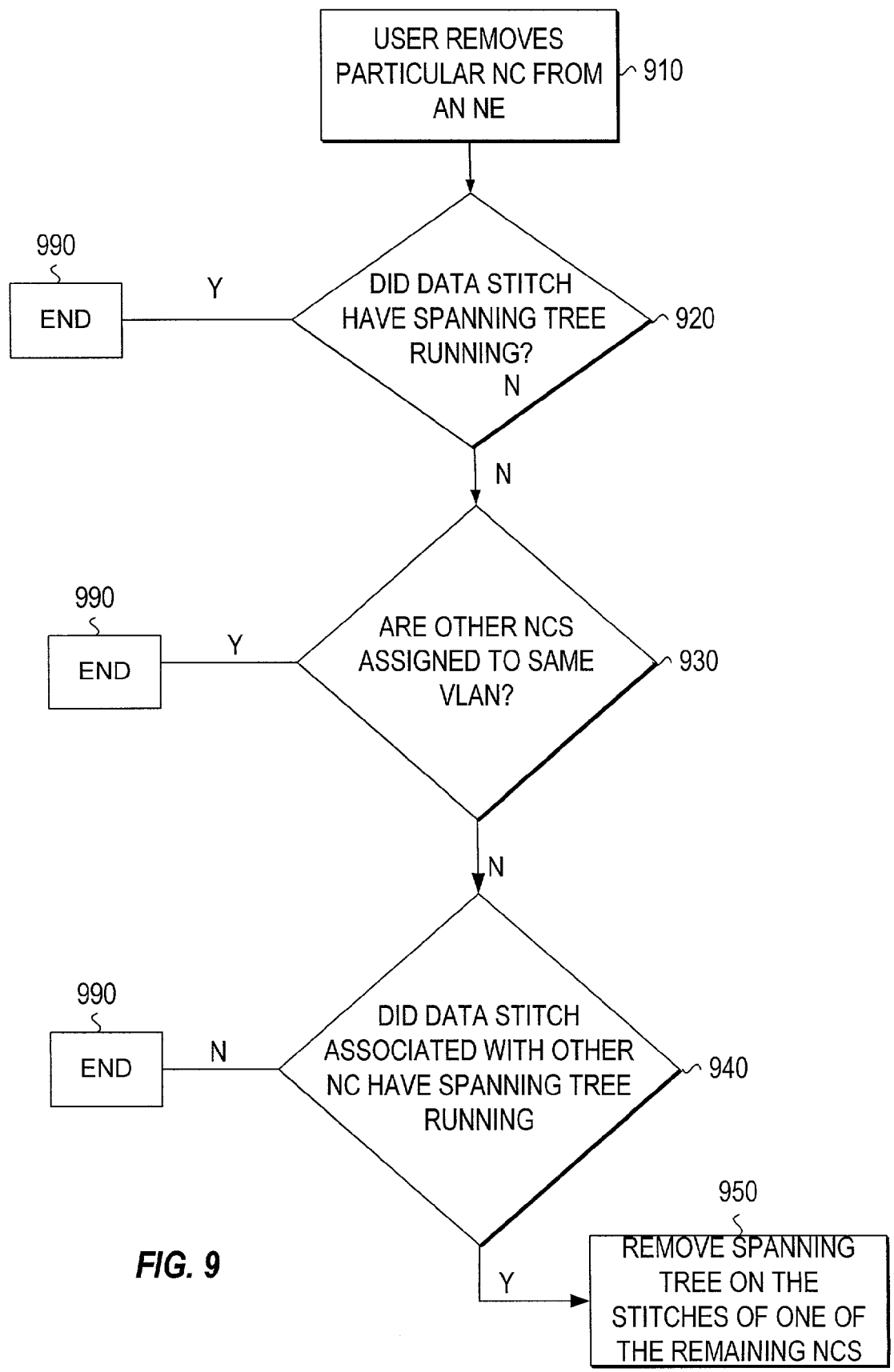
FIG. 9 illustrates an exemplary method for determining when to stop running spanning tree on an internal stitch.

FIG. 9 illustrates a exemplary process for determining if spanning tree should be removed. In this case, a user will remove a particular NC from an NE (step 910). As should be obvious to one of ordinary skill in the art this will also remove the data stitch associated with the NC. The NE will then determine if the data stitch associated with that NC had spanning tree run thereon (step 920). If the answer is yes, that the data stitch had spanning tree run thereon, the process ends (step 990). If the answer is no, the NE will determine if there are other NCs that are assigned the same VLAN as the removed NC (step 930). If the answer is no that there are no other NCs assigned to the same VLAN then the process ends (step 990). If the answer is yes, a determination is made as to whether the data stitch associated with the other NC has a spanning tree running thereon (step 940). If the answer is no then the process ends (step 990). If the answer is yes then the spanning tree is removed (step 950).

It would be obvious to one of ordinary skill in the art that rearranging the steps of this method is well within the scope of the current invention. Moreover, there are numerous other methods that could accomplish the same result which are all within the scope of the current invention.

The above functions can be implemented as a set of computer instructions stored on a computer readable medium.

Although this invention has been illustrated by reference to specific embodiments, it will be apparent to those of ordinary skill in the art that various changes and modifications may be made, which clearly fall within the scope of the invention. The invention is intended to be protected broadly within the spirit and scope of the appended claims.

The invention claimed is:

1. A method for preventing a layer-2 forwarding loop within a data-stitching network element, the method comprising:
   assigning a new network circuit to the data-stitching network element;
   determining that the new network circuit is assigned a VLAN that was previously assigned to an existing network circuit;
   running spanning tree on a data-stitch created by the new network circuit;
   removing a network circuit from the data-stitching network element;
   determining that the removed network circuit was assigned a VLAN that is also used by another network circuit;
   removing spanning tree from the other network circuit; and
   determining that the another network circuit had spanning tree run thereon.

2. The method of claim 1, wherein running spanning tree on the data-stitch blocks the data-stitch.

3. The method of claim 1, wherein said removing will be performed only in response to a determination that the another network circuit had spanning tree run thereon.

4. The method of claim 1, further comprising determining if the removed network circuit had spanning tree run thereon.

5. The method of claim 4, wherein said determining that the another network circuit had spanning tree run thereon will be performed only in response to a determination that the removed network circuit did not have spanning tree run thereon.

6. A method for preventing a layer-2 forwarding loop within a data-stitching network element, the method comprising:
   assigning a new network circuit to the data-stitching network element;
   determining that the new network circuit is assigned a VLAN that was previously assigned to an existing network circuit;
   running spanning tree on a data-stitch created by the new network circuit;
   removing a network circuit from the data-stitching network element;
   determining that the removed network circuit was assigned a VLAN that is also used by another network circuit;
   removing spanning tree from the other network circuit; and
   determining if the removed network circuit had spanning tree run thereon.

7. The method of claim 6, wherein said removing will be performed only in response to a determination that the removed network circuit did not have spanning tree run thereon.

8. The method of claim 6, wherein said determining that the removed network circuit was assigned a VLAN that is also used by another network circuit will be performed only in response to a determination that the removed network circuit did not have spanning tree run thereon.

9. A computer program embodied on a computer readable medium for preventing a layer-2 forwarding loop within a data-stitching network element, the computer program comprising:
   a code segment for assigning a new network circuit to the data-stitching network element;
   a code segment for determining that the new network circuit is assigned a VLAN that was previously assigned to an existing network circuit;
   a code segment for running spanning tree on a data-stitch created by the new network circuit;
   a code segment for removing a network circuit from the data-stitching network element;
   a code segment for determining that the removed network circuit was assigned a VLAN that is also used by another network circuit;
   a code segment for removing spanning tree from the other network circuit; and
   a code segment for determining if the removed network circuit had spanning tree run thereon.

10. A method for ensuring that no layer-2 forwarding loops will be allowed within a telecommunications network, the method comprising:
    defining a new network circuit for a network element;
    assigning a VLAN for the new network circuit, comprising:
        assigning a test VLAN for the new network circuit;
        determining assignment of VLANs to other network circuits associated with the network element;
        determining if the test VLAN intersects entirely with any of the other assigned VLANs;
        determining if the test VLAN is distinct from all the other assigned VLANs; and
        accepting the test VLAN in response to
            a determination that the test VLAN intersects entirely with any of the other assigned VLANs, or
            a determination that the test VLAN is distinct from all the other assigned VLANs;
    running spanning tree on links of the network element associated with the new network circuit and assigned the VLAN; and
    if the network element is a data-stitching network element;
        determining that the VLAN assigned to the new network circuit was previously assigned to an existing network circuit, and
        running spanning tree on a data-stitch created by the new network circuit.

11. A system for ensuring that no layer-2 forwarding loops will be allowed within a telecommunications network, the system comprising:
    means for defining a new network circuit for a network element;
    means for assigning a VLAN for the new network circuit, comprising:
        means for assigning a test VLAN for the new network circuit;
        means for determining assignment of VLANs to other network circuits associated with the network element;
        means for determining if the test VLAN intersects entirely with any of the other assigned VLANs;
        means for determining if the test VLAN is distinct from all the other assigned VLANs; and
        means for accepting the test VLAN in response to
            a determination that the test VLAN intersects entirely with any of the other assigned VLANs, or
            a determination that the test VLAN is distinct from all the other assigned VLANs;
    means for running spanning tree on links of the network element associated with the new network circuit and assigned the VLAN; and
    a data-stitching network element including:
        means for determining that the VLAN assigned to the new network circuit was previously assigned to an existing network circuit, and
        means for running spanning tree on a data-stitch created by the new network circuit.

12. A method for preventing a data-stitch within a data-stitching network element from inadvertently being blocked, the method comprising:
    removing a network circuit from the data-stitching network element;
    determining that the removed network circuit was assigned a VLAN that is also used by another network circuit;
    removing spanning tree from a data-stitch associated with the other network circuit; and
    determining that the removed network circuit did not have spanning tree run thereon.

13. A method for preventing a data-stitch within a data-stitching network element from inadvertently being blocked, the method comprising:
    removing a network circuit from the data-stitching network element;
    determining that the removed network circuit was assigned a VLAN that is also used by another network circuit;
    removing spanning tree from a data-stitch associated with the other network circuit; and determining that the other network circuit had spanning tree run thereon.

14. A method for ensuring that no paths within a telecommunications network will inadvertently be blocked, the method comprising:
   removing a new network circuit from a network element;
   disassociating links of the network element from a VLAN assignment associated with the removed network circuit; and
   if the network element is a data-stitching network element;
      determining that the removed network circuit was assigned a VLAN that is also used by another network circuit,
      determining that the another network circuit had spanning tree run thereon; and
      removing spanning tree from a data-stitch associated with the other network circuit.

15. A network device for preventing formation of layer-2 forwarding loops within a telecommunications network, the network device comprising:
   memory;
   one or more network interfaces; and
   a processor configured to:
      define a new network circuit for the network device;
      assign a VLAN for the new network circuit;
      determine that the VLAN assigned to the new network circuit was previously assigned to an existing network circuit, and
      run spanning tree on a data-stitch created by the new network circuit;
   wherein said processor is further configured to run spanning tree on links of the network device associated with the new network circuit and assigned the VLAN.

16. The network device of claim 15, wherein said processor is further configured to:
   remove a network circuit from the network device;
   determine that the removed network circuit was assigned a VLAN that is also used by another network circuit; and
   remove spanning tree from a data-stitch associated with the other network circuit.

17. The network device of claim 16, wherein said processor is further configured to disassociate links of the network device from a VLAN assignment associated with the removed network circuit.

18. A network device for preventing formation of layer-2 forwarding loops within a telecommunications network, the network device comprising:
   memory;
   one or more network interfaces; and
   a processor configured to:
      define a new network circuit for the network device;
      assign a VLAN for the new network circuit;
      determine that the VLAN assigned to the new network circuit was previously assigned to an existing network circuit, and
      run spanning tree on a data-stitch created by the new network circuit;
   wherein said processor assigns a VLAN for the new network circuit by:
   assigning a test VLAN for the new network circuit;
   determining assignment of VLANs to other network circuits associated with the network device;
   determining if the test VLAN intersects entirely with any of the other assigned VLANs;
   determining if the test VLAN is distinct from all the other assigned VLANs; and
   accepting the test VLAN in response to
      a determination that the test VLAN intersects entirely with any of the other assigned VLANs, or
      a determination that the test VLAN is distinct from all the other assigned VLANs.

19. A network device for preventing paths within a telecommunications network from inadvertently being blocked, the network device comprising:
   memory;
   one or more network interfaces; and
   a processor configured to:
      remove a network circuit from the network device;
      determine that the removed network circuit was assigned a VLAN that is also used by another network circuit,
      determine that the another network circuit had spanning tree run thereon; and
      remove spanning tree from a data-stitch associated with the other network circuit.

20. The network device of claim 19, wherein said processor is further configured to disassociate links of the network device from a VLAN assignment associated with the removed network circuit.

21. A network device for preventing paths within a telecommunications network from inadvertently being blocked, the network device comprising:
   memory;
   one or more network interfaces; and
   a processor configured to:
      remove a network circuit from the network device;
      determine that the removed network circuit was assigned a VLAN that is also used by another network circuit; and
      remove spanning tree from a data-stitch associated with the other network circuit;
   wherein said processor is further configured to determine that the removed network circuit did not have spanning tree run thereon.

22. A network device for preventing paths within a telecommunications network from inadvertently being blocked, the network device comprising:
   memory;
   one or more network interfaces; and
   a processor configured to:
      remove a network circuit from the network device;
      determine that the removed network circuit was assigned a VLAN that is also used by another network circuit, and
      remove spanning tree from a data-stitch associated with the other network circuit;
   wherein said processor is further configured to determine that the other network circuit had spanning tree run thereon.

23. A network device for preventing paths within a telecommunications network from inadvertently being blocked, the network device comprising:
   memory;
   one or more network interfaces; and
   a processor configured to:
      remove a network circuit from the network device;
      determine that the removed network circuit was assigned a VLAN that is also used by another network circuit; and remove spanning tree from a data-stitch associated with the other network circuit;
wherein said processor is further configured to:
define a new network circuit for the network device;
assign a VLAN for the new network circuit;
determine that the VLAN assigned to the new network circuit was previously assigned to an existing network circuit; and
run spanning tree on a data-stitch created by the new network circuit.

24. The network device of claim 23, wherein said processor is further configured to run spanning tree on links of the network device associated with the new network circuit and assigned the VLAN.

* * * * *